United States Patent [19]
Dane et al.

[11] Patent Number: 5,260,954
[45] Date of Patent: Nov. 9, 1993

[54] PULSE COMPRESSION AND PREPULSE SUPPRESSION APPARATUS

[75] Inventors: Clifford B. Dane; Lloyd A. Hackel; Edward V. George, all of Livermore; John L. Miller; William F. Krupke, both of Pleasanton, all of Calif.

[73] Assignee: The Unived States of America as Represented by the United States Department of Energy, Washington, D.C.

[21] Appl. No.: 968,570

[22] Filed: Oct. 29, 1992

[51] Int. Cl.⁵ .............................................. H01S 3/10
[52] U.S. Cl. ....................................... 372/25; 359/334; 359/347; 359/349; 372/3; 372/30
[58] Field of Search ........................ 372/2, 3, 25, 29, 30, 372/108; 359/333, 334, 335, 345, 346, 347, 348, 349

[56] References Cited

U.S. PATENT DOCUMENTS

| | | | |
|---|---|---|---|
| 3,617,927 | 11/1971 | Pohl | 331/94.5 |
| 4,205,278 | 5/1980 | George et al. | 359/345 X |
| 4,233,571 | 11/1980 | Wang et al. | 331/94.5 C |
| 4,429,393 | 1/1984 | Giuliano | 372/21 |
| 4,529,943 | 7/1985 | George et al. | 372/3 X |
| 4,573,157 | 2/1986 | O'Meara | 372/19 |
| 4,727,553 | 2/1988 | Fork et al. | 372/25 |
| 4,780,876 | 10/1988 | Smith et al. | 372/3 |
| 4,791,644 | 12/1988 | Dube' | 372/3 |
| 4,936,660 | 6/1990 | Clendening, Jr. et al. | 350/354 |
| 4,972,156 | 11/1990 | Gregor et al. | 330/4.3 |
| 4,972,423 | 11/1990 | Alfano et al. | 372/25 |
| 5,034,627 | 7/1991 | Ayral et al. | 307/426 |
| 5,045,719 | 9/1991 | Ayral et al. | 359/327 |

Primary Examiner—John D. Lee
Attorney, Agent, or Firm—Miguel A. Valdes; Isabelle R. McAndrews; William R. Moser

[57] ABSTRACT

A pulse compression and prepulse suppression apparatus (10) for time compressing the output of a laser (14). A pump pulse (46) is separated from a seed pulse (48) by a first polarized beam splitter (20) according to the orientation of a half wave plate (18). The seed pulse (48) is directed into an SBS oscillator (44) by two plane mirrors (22, 26) and a corner mirror (24), the corner mirror (24) being movable to adjust timing. The pump pulse (46) is directed into an SBS amplifier 34 wherein SBS occurs. The seed pulse (48), having been propagated from the SBS oscillator (44), is then directed through the SBS amplifier (34) wherein it sweeps the energy of the pump pulse (46) out of the SBS amplifier (34) and is simultaneously compressed, and the time compressed pump pulse (46) is emitted as a pulse output (52). A second polarized beam splitter (38) directs any undepleted pump pulse 58 away from the SBS oscillator (44).

20 Claims, 1 Drawing Sheet

PULSE COMPRESSION AND PREPULSE SUPPRESSION APPARATUS

The invention described herein arose in the course of, or under, contract No. W-7405-ENG-48 between the U.S. Department of Energy and the University of California.

BACKGROUND OF THE INVENTION

The present invention relates generally to lasers, and more particularly to a method for compressing laser pulses and, further, for suppressing prepulse laser emissions.

Increasingly, in the effort to develop new and better uses for lasers, it has been found to be necessary or desirable to manipulate the character of laser beams and pulses. Accordingly, means have been developed to lengthen, shorten, intensify and/or modify in form the output of pulsed lasers. Furthermore, improvements to such means, and new and better means for accomplishing these purposes, continue to be much sought after.

One of the purposes to which the lasers are just now beginning to be applied is the stimulation of X-ray radiation. The present inventors are engaged in utilizing such stimulated X-ray emission for applications such as Xray lithography. In this application the laser beam is directed at a metal or metal oxide target which is excited thereby to emit X-ray radiation. It is necessary to have a relatively high power laser pulse for this purpose, and it is also important that the power of the pulse be confined in time to a relatively short duration and that there not be a "prepulse" emission (an unwanted laser emission preceding the desired high power pulse), for reasons which will be discussed hereinafter.

In order to achieve a pulse having the desired short duration and high power characteristics, methods of pulse compression have been tried. Pulse compression is desirable as a means for achieving this goal, since modulation of the laser excitation to achieve high power pulses of short duration is difficult and, further, since the required instantaneous power may be greater than that which the laser emitter is capable of producing. Pulse compression is of particular interest to those interested in stimulated X-ray emission because experimental evidence indicates that X-rays are generated with much greater efficiency when the laser energy is delivered within the time scale of one to several nanoseconds, rather than in a longer time such as ten to twenty nanoseconds. However, operation of the laser with such high energy short pulses places a much greater load on the laser cavity optics which may be damaged by intense laser radiation. Consequently, it is desirable to have a means for allowing long pulses of moderate peak energy within the laser amplifier and then to externally shorten these pulses for more efficiency in generating the X-rays.

It is known in the art to use the phenomenon of stimulated Brillouin scattering ("SBS") to provide pulse modification. U.S. Pat. No. 3,617,927 teaches an arrangement of components for producing "giant" pulse using SBS. However, to the inventors' knowledge, no means for using SBS to produce a very high power output laser pulse is known in the prior art. Prior art means for producing a compressed pulse all require that a large amount of energy of the long pulse be focused into the SBS cell, thus limiting the total amount of energy that can be compressed.

As mentioned previously, another consideration in the application of lasers for the stimulation of X-ray emission is that the "prepulse" should be suppressed. Prepulse suppression is desirable because, in high power laser systems such as the regenerative amplifier under development at Lawrence Livermore National Laboratory, a pulse as large as 1% to 5% of the energy of the main pulse can be generated several hundred nanoseconds before the desired output. It would be desirable to implement a technique for suppressing these prepulses so that they do not arrive at and deplete the target prior to the arrival of the main pulse. To the inventors' knowledge, no method for accomplishing this that does not require active electro-optic switches (Pockels cells) has existed in the prior art.

No prior art means, to the inventor's knowledge has provided highly efficient pulse compression of a high power laser pulse. Nor has any prior art means adequately suppressed prepulse emissions of high power lasers. All previous means for compressing laser pulses have been incapable of compressing high energy pulses.

SUMMARY OF THE INVENTION

Accordingly, it is an object of the present invention to provide a method and means for compressing a high energy laser pulse.

It is another object of the present invention to provide a method and means for preventing prepulse emission in a laser pulse without using electro-optic switches.

It is still another object of the present invention to provide a method and means for compressing a laser pulse that requires only a small amount of energy to be focused into the SBS medium and is, therefore, readily scalable to very high laser pulse energies.

It is yet another object of the present invention to provide a method and means for compressing a pulse which is highly efficient in the sense that most of the energy entering the compression means is returned in the compressed pulse.

It is still another object of the present invention to provide a method and means to provide a pulse suitable for the stimulation of X-ray emission.

It is yet another object of the present invention to provide a method and means for compressing a laser pulse which is rugged and reliable in operation in that the compression means is not damaged by high energy laser pulses.

Briefly, the present invention is an arrangement of components which directs a laser pulse such that much of the energy of the laser pulse is temporarily stored in an SBS amplifier while an SBS oscillator creates a return pulse through the SBS amplifier. The return pulse sweeps the energy from the amplifier thus creating a time compressed return pulse having much of the energy of the initial laser pulse. The presently preferred embodiment of the invention has additional arrangement of optical components which separate the laser pulse into a primary component containing most of the energy of the laser pulse and a secondary component. The secondary component is directed to the SBS oscillator which produces a low power seed pulse. Simultaneously, the primary component of the laser beam is directed to the SBS amplifier wherein stimulated Brillouin scattering is induced. The seed pulse from the SBS oscillator is directed into the SBS amplifier and as it sweeps therethrough it gathers the energy of the primary component of the pulse and, at the same time, is temporally compressed, thus producing a short output pulse having essentially all of the energy of the initial laser pulse. Therefore, the presently preferred embodiment of the invention eliminates inefficiencies which might be caused by necessary attenuation of the laser pulse prior to it being introduced into the SBS oscillator. Since SBS is a threshold phenomenon, the threshold can be set such that prepulse emissions from the laser are below threshold level, and thus are suppressed.

An advantage of the present invention is that a high energy laser pulse is compressed in time.

A further advantage of the present invention is that only a small amount of the input energy is focused into the SBS medium oscillator.

Yet another advantage of the present invention is that essentially all of the energy of the initial laser pulse is returned in the compressed pulse.

Still another advantage of the present invention is that prepulse emissions are suppressed.

Yet another advantage of the present invention is that damage to the pulse compression means caused by high energy laser pulses is prevented.

Still another advantage of the present invention is that the laser may be operated in a mode which is less harmful to the laser.

These and other objects and advantages of the present invention will become clear to those skilled in the art in view of the description of the best presently known mode of carrying out the invention and the industrial applicability of the preferred embodiment, as described herein and as illustrated in the drawing.

DETAILED DESCRIPTION OF THE INVENTION

Figure 1:
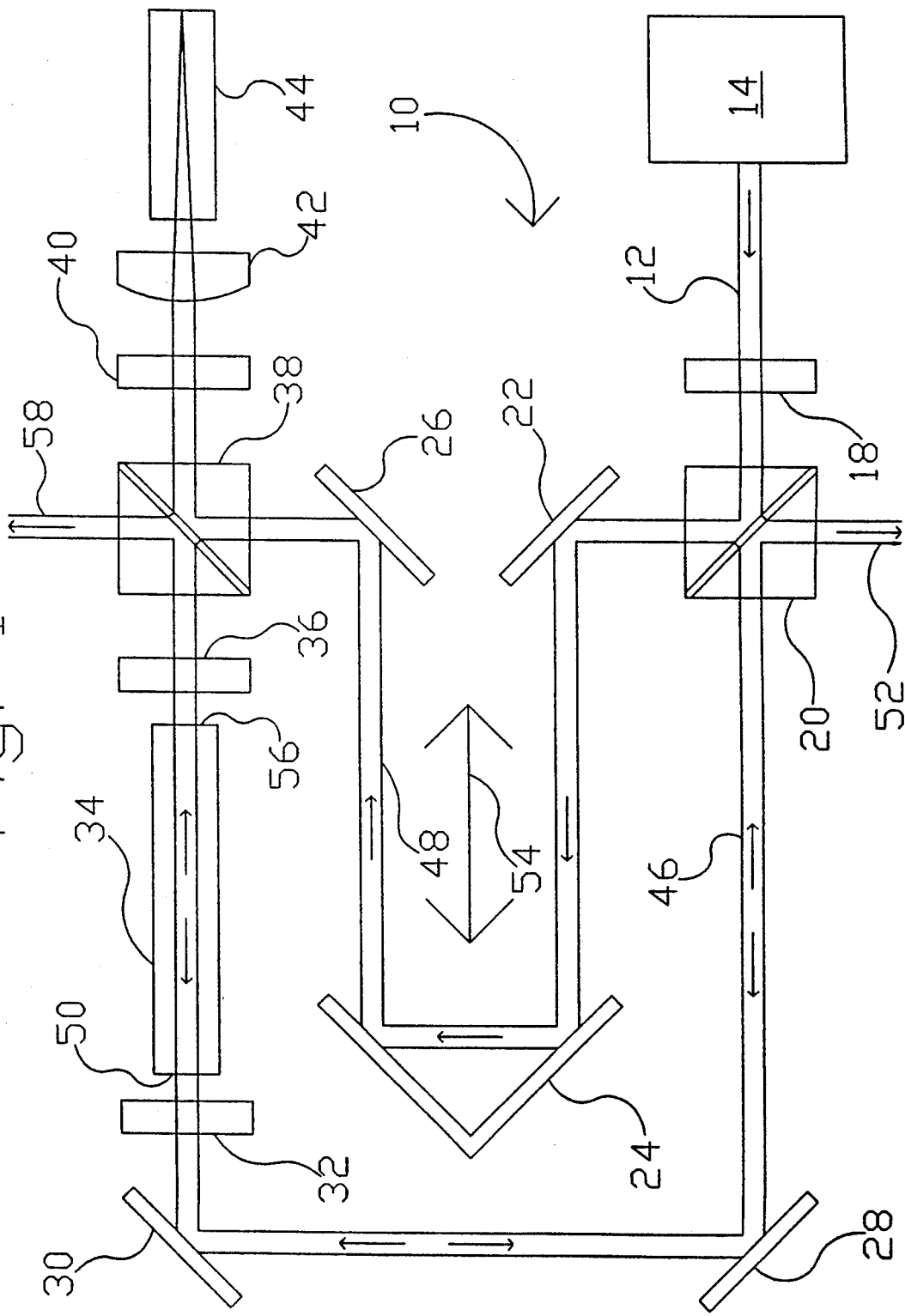
FIG. 1 is a diagrammatic representation of a pulse compression and prepulse suppression apparatus according to the present invention.

The best presently known mode for carrying out the invention is a pulse compression and prepulse compression apparatus ("pulse compressor") having a unique arrangement of components for both compressing a laser pulse and preventing prepulse suppression. The predominant expected usage of the inventive pulse compressor is in modifying high power laser beam pulses for scientific and industrial applications, particularly in X-ray lithography applications wherein a very short duration pulse is desirable and wherein a laser prepulse is undesirable. A pulse compressor according to the present invention is illustrated in the diagram of FIG. 1, and is designated therein by the general reference character 10. The pulse compressor 10 is intended for the modification of a laser beam 12 emitted from a laser 14, as will be described hereinafter.

The best presently known embodiment 10 of the present invention has a half wave plate 18, a first polarized beam splitter 20, a first plane mirror 22, a corner mirror 24, a second plane mirror 26, a third plane mirror 28, a fourth plane mirror 30, a first quarter wave plate 32, an SBS amplifier 34, a second quarter wave plate 36, a second polarized beam splitter 38, a third quarter wave plate 40, a lens 42 and an SBS oscillator 44.

According to the present inventive method, the laser beam 12 is a pencil of polarized coherent light which is projected from the laser 14 toward the first polarized beam splitter 20. For purposes of the following example, we shall say that the laser beam 12 is vertically polarized, although this is by way of example only and is not necessary to the invention. Following this example, the first polarized beam splitter 20 is configured to pass horizontally polarized light and to reflect vertically polarized light. The half wave plate 18 through which the laser beam 12 travels in its path toward the first polarized beam splitter 18 is rotatably mounted in relation to the laser beam 12. In one orientation, the half wave plate 18 will rotate the laser beam 12 by ninety degrees to horizontal polarization, which will cause all of the laser beam 12 to pass through the first polarized beam splitter 20. However, by rotating the half wave plate 18 slightly, the polarization of the laser beam 12 slightly altered such that a small portion thereof will be reflected from the first polarized beam splitter 20. That portion of the laser beam 12 which is initially passed through the first polarized beam splitter 20 is designated herein as a pump pulse 46, and that portion of the laser beam 12 which is initially reflected from the first polarized beam splitter 20 is designated herein as a seed pulse 48.

The pump pulse 46 proceeds from the first polarized beam splitter 20 to be redirected by the third plane mirror 28, and then by the fourth plane mirror 30 through the first quarter wave plate 32. The first quarter wave plate 32 changes the polarization of the pump pulse 46 in a manner which may be thought of as rotating it by 45°. (Although the effect is,, in fact, more complex, it is unnecessary to go into detail regarding the effect of quarter wave plates for the purpose of explaining the present invention, as this aspect is well understood in the art.) The pump pulse 46 proceeds from the first quarter wave plate 32 to the SBS amplifier 34 wherein, provided that the pump pulse 46 has sufficient energy to initiate the phenomenon, stimulated Brillouin scattering will occur, thus at least temporarily impeding the progress of the pump pulse 46 through the SBS amplifier 34.

The seed pulse 48, as discussed previously herein, is polarized such that it is reflected from the first polarized beam splitter 20 (that being vertically polarized, in the present example), from which it is directed toward the first plane mirror 22. The first plane mirror redirects the seed pulse 48 toward a corner mirror 24 which, in turn, redirects the seed pulse 48 toward the second plane mirror 26. The second plane mirror 26 then redirects the seed pulse 48 toward the second polarized beam splitter 38 which is configured such that it reflects the vertically polarized seed pulse 48 through the third quarter wave plate 40, the lens 42 and into the SBS oscillator 44. Within the SBS oscillator 44, stimulated Brillouin scattering occurs, which generates a propagation of the seed pulse 48 back out of the SBS oscillator 44. The seed pulse 48 then passes through the lens 42 and the third quarter wave plate 40. Thus having passed twice through the third quarter wave plate 40 the seed pulse 48 is polarized horizontally such that it now passes through the second polarized beam splitter 38, the second quarter wave plate 36 and into the SBS amplifier 34. As the seed pulse 48 passes through the second quarter wave plate 36, its polarization is rotated so as to match the polarization of the pump pulse 46. As the seed pulse 48 passes through the SBS amplifier 34 it sweeps with it all energy stored therein, that energy being that of the pump pulse 46 which is producing the SBS effect within the SBS amplifier 34. As the seed pulse 48 is amplified it is simultaneously temporally compressed.

Accordingly, the SBS amplifier 34 emits, from a primary end 50 thereof, a pulse having the time compressed characteristics attained by the seed pulse 48 and the combined energies of the seed pulse 48 and the pump pulse 46 (less losses). This pulse retraces the path of the pump pulse 46 back through the first quarter wave plate 32, whereby it is rotated to vertical polarization. The pulse is then redirected by the fourth plane mirror 30 and then the third plane mirror 28 to the first polarized beam splitter 20. The first polarized beam splitter 20 then reflects the vertically polarized pulse as a pulse output 52, as shown in FIG. 1.

In order to accomplish the coordination of timing necessary such that the oscillator pulse 48 will be returning through the SBS amplifier 34 while the energy of the pump pulse 46 is temporarily stored therein as stimulated Brillouin scatter,, the corner mirror 24 is movable as indicated by a corner mirror timing plane arrow 54. It should be noted that, in case there is a failure of such timing, the best presently known embodiment 10 of the present invention provides that any portion of the pump pulse 46 which should exit from a second end 56 of the SBS amplifier 34 will be reflected from the second polarized beam splitter 38 (having been rotated to vertical polarization by passing through both the first quarter wave plate 32 and the second quarter wave plate 36) as an undepleted pump pulse 58 rather than proceeding into the SBS oscillator 44, since the SBS oscillator 44 would be damaged by the energy of the pump pulse 46.

It should be noted that it is not necessary to the practice of the present invention that the seed pulse 48 be directed away from the pump pulse 46 such that the seed pulse 48 does not travel through the SBS amplifier 34, as is shown in relation to the best presently known embodiment 10 of the present invention. However, if the seed pulse 48 and the pump pulse 46 are left together (that is. if the laser beam 12 is not split into the separate seed pulse 48 and pump pulse 46, as shown) then several of the advantages of the invention are lost or diminished. Where the seed pulse 48 is directed through the SBS amplifier, there is no possibility of fine tuning the timing by moving the corner mirror 24, nor is the above described means for directing the undepleted pump pulse 58 away from the SBS oscillator 44 (and thus for protecting the SBS oscillator 44) operable. Furthermore, if the seed pulse 48 were to be combined with the pump pulse 46 it would have to be attenuated before being introduced into the SBS oscillator, thus reducing efficiency through attenuation losses. For these reasons, while the practice of the present invention may be viable without the redirection of the oscillator pulse 48 as described herein (and, indeed, it might even be a preferred method in some application not now known to the inventors) the best presently known embodiment 10, as described herein, is now considered to be the superior means for practicing the invention.

In the best presently known embodiment 10 of the present invention, both the SBS amplifier 34 and the SBS oscillator 44 are conventional in nature. It is known in the prior art to construct such devices as the SBS amplifier 34 and the SBS oscillator 44 to contain piezoelectric materials which are transparent to the laser beam 12, such as carbon tetrachloride ($CCl_4$). In the best presently known embodiment 10 of the present invention, the SBS amplifier 34 is constructed to have a transit time (considering the particular material used therein) of $\frac{1}{2}$ the pulsewidth of the laser beam 12.

Various modifications may be made to the invention without altering its value or scope. For example, the optical components of the invention could be rearranged such that the seed pulse 48 and the pump pulse 46 travel a straight line between the first plane mirror 22 and the second plane mirror 26, and the first polarized beam splitter 20 and the first quarter wave plate 32, respectively (thus eliminating the third plane mirror 28, the fourth plane mirror 30 and the corner mirror 24). Of course this arrangement would require more linear space and would lose the advantage of being able to move the corner mirror 24 to adjust timing.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The pulse compressor 10 is intended for time compressing pulses of relatively high energy, such as are required for the stimulation of X-ray emission in the field of laser X-ray lithography. As one skilled in the art will appreciate, only a relatively few laser configurations are capable of producing the instantaneous energy required to stimulate X-ray emission.

The present inventive pulse compressor 10 has been developed to stimulate the emission of X-rays by directing the pulse output 52 onto a metal oxide tape which is advanced to present a new metal oxide target to each successive pulse of the laser beam. The primary intended usage is to produce X-rays to effectuate X-ray lithography, however the inventive method for compressing laser pulses could be applied wherever this is required, and it is particularly applicable where the laser pulses to be compressed are high energy pulses which would damage conventional prior art compression means.

Since the SBS is a threshold type process it is a simple matter for one skilled in the art to adjust the half wave plate 18 such that any prepulse from the laser 14 remains below the operating threshold of the SBS oscillator 44. In this condition, the prepulse would generate no return and, thus, is effectively eliminated. The beam area will be sized such that the prepulse remains below threshold while the main pulse is compressed as desired. It should be noted that, if the length of the SBS amplifier 34 is smaller than the pulse length of the laser beam 12, a train of compressed pulses spaced by the round trip time for light in the SBS amplifier 34 cavity will be generated. The train of compressed pulses may be even more efficient in X-ray generation than the single compressed pulse.

The pulse compression and prepulse suppression apparatus 10 may be utilized wherever it is desired to time compress a laser pulse. Therefore, it is expected that it will be acceptable in the field as a substitute for conventional means for compressing laser pulses, particularly where the laser pulse to be compressed is of relatively high energy or where it is further desired to suppress a prepulse. For these and other reasons, it is expected that the utility and industrial applicability of the invention will be both significant in scope and long-lasting in duration.

We claim:

1. An apparatus for compressing a laser pulse, comprising:
   a stimulated Brillouin scattering ("SBS") amplifier; and
   an SBS oscillator, wherein;
      at least a substantial portion of the laser pulse is directed into said SBS amplifier as a pump pulse;
      at least some portion of the laser pulse is directed into said SBS oscillator as a seed pulse;
      the output of the SBS oscillator is directed into the SBS amplifier; and
      the output of the SBS amplifier is emitted as a compressed pulse.

2. The apparatus of claim 1, wherein:
   the seed pulse is directed around said SBS amplifier such that it does not travel through said SBS amplifier prior to entering said SBS oscillator.

3. The apparatus of claim 1, and further including:
   a half wave plate for rotating the polarization of the laser pulse; and
   a first polarized beam splitter for separating the seed pulse from the pump pulse, wherein;
   the half wave plate is rotatably affixed within the apparatus such that the polarization of the laser pulse as the laser pulse strikes the first polarized beam splitter is rotated as the half wave plate is rotated.

4. The apparatus of claim 3, wherein:
   the seed pulse is directed from the first, polarized beam splitter toward said SBS oscillator by a plurality of mirrors.

5. The apparatus of claim 4, wherein:
   at least one of the mirrors is movable such that the length of the path traveled by the seed pulse between the first polarized beam splitter and said SBS oscillator is variable.

6. The apparatus of claim 4, and further including:
   a second polarized beam splitter positioned such that the seed pulse is initially reflected therefrom toward said SBS oscillator.

7. The apparatus of claim 6, and further including:
   an oscillator quarter wave plate positioned between said SBS oscillator and the second polarized beam splitter such that the seed pulse travels though the oscillator quarter wave plate when entering and exiting the SBS oscillator, thereby causing the seed pulse to pass through the second polarized beam splitter upon exiting said SBS oscillator, wherein said seed pulse enters the SBS amplifier after it exits said SBS oscillator.

8. The apparatus of claim 1, and further including:
   a primary quarter wave plate inserted in the path of the pump pulse in front of said SBS amplifier, such that the pump pulse passes through the primary quarter wave plate upon entering and exiting said SBS amplifier.

9. A method for compressing a laser beam pulse, comprising:
   directing at least a first portion of the laser beam pulse into a stimulated Brillouin scattering ("SBS") amplifier;
   directing at least a second portion of the laser beam pulse into an SBS oscillator;
   directing the output of said SBS oscillator into said SBS amplifier; and
   providing the output of said SBS amplifier as a compressed pulse output.

10. The method of claim 9, wherein:
    the first portion of the laser beam is separated from the second portion of the laser beam by polarizing the laser beam and directing it into a first polarized beam splitter such that the first portion of the laser beam passes through the first polarized beam splitter while the second portion of the laser beam is reflected from the first polarized beam splitter;
    after the first portion of the laser beam is separated from the second portion of the laser beam, the second portion of the laser beam is passed once through a third quarter wave plate and then into the SBS oscillator from which it is emitted back through the third quarter wave plate and then through a second polarized beam splitter, the second polarized beam splitter being positioned so as to pass the second portion of the laser beam therethrough, the second portion of the laser beam then passing through a second quarter wave plate and then into said SBS amplifier;
    after the first portion of the laser beam is separated from the second portion of the laser beam, the first portion of the laser beam is directed through a first quarter wave plate and into said SBS amplifier.

11. The method of claim 10, wherein:
    the first portion of the laser beam and the second portion of the laser beam are recombined within the SBS amplifier into a compressed pulse, and the compressed pulse is directed from the SBS amplifier through the first quarter wave plate and back to the first polarized beam splitter, from which it is reflected.

12. The method of claim 10, wherein:
    a beam rotating means is inserted in the path of the beam prior to the laser beam first entering the first polarized beam splitter, such that the portion of the beam to be reflected from the first polarized beam splitter as the second portion of the laser beam may be controlled by the act of rotating the beam rotating means.

13. The method of claim 10, wherein:
    the second portion of the laser beam is directed from the first polarized beam splitter to the second polarized beam splitter using a plurality of mirrors, at least one of the plurality f mirrors being movable such that the path of said second portion of the laser beam may be adjusted in length whenever necessary to enable the first portion of the laser beam to converge with the second portion of the laser beam within the SBS amplifier.

14. A laser pulse compression device for compressing a polarized laser pulse, comprising:
    a laser source for producing the laser pulse;
    a first polarized beam splitter positioned in the path of the laser pulse such that a seed pulse is reflected therefrom and a pump pulse is passed therethrough, the seed pulse and the pump pulse each being at least a portion of the laser pulse;
    a stimulated Brillouin scattering ("SBS") amplifier;
    an SBS oscillator;
    pump pulse directing means for directing the pump pulse into a first end of the SBS amplifier;
    seed pulse directing means for directing the seed pulse into the SBS oscillator and then for directing the seed pulse, after it is emitted from the SBS oscillator, into a second end of the SBS amplifier;
    the second end of the SBS amplifier being the end opposite the first end of the SBS amplifier; and compressed pulse directing means for directing the pump pulse from the first end of the SBS amplifier out of the laser pulse compression device.

15. The laser pulse compression device of claim 14, wherein:
said pump pulse directing means includes a first plurality of mirrors for directing the pump pulse from said first polarized beam splitter through a first quarter wave plate and then into the first end of said SBS amplifier;
said seed pulse directing means includes a second plurality of mirrors for directing the seed pulse from said first polarized beam splitter into a second polarized beam splitter, the second polarized beam splitter being positioned such that the seed pulse is reflected therefrom through a third quarter wave plate into the SBS oscillator, and further such that when the seed pulse is emitted from the SBS oscillator the seed pulse again travels through the third quarter wave plate and then through the second polarized beam splitter, then through a second quarter wave plate and into the second end of said SBS amplifier.

16. The laser pulse compression device of claim 15, and further including:
a half wave plate positioned between said laser source and said first polarized beam splitter, the half wave plate being rotatably mounted such that the polarization of the laser pulse can be rotated thereby regulating the quantity of the laser pulse which is initially reflected from the first polarized beam splitter as the seed pulse.

17. The laser pulse compression device of claim 15, wherein:
said compressed pulse directing means includes the first plurality of mirrors such that the laser pulse is directed from the first end of the SBS amplifier through the first quarter wave plate and back into the first polarized beam splitter, from which the laser pulse is reflected out of the laser pulse compression device.

18. The laser pulse compression device of claim 15, wherein:
the second plurality of mirrors includes a movable mirror for altering the length of the path of the seed pulse between said first polarized beam splitter and the second polarized beam splitter.

19. The laser pulse compression device of claim 15, and further including:
a focusing lens positioned between the second quarter wave plate and said SBS oscillator, for focusing the seed pulse into said SBS oscillator.

20. The laser pulse compression device of claim 15, wherein:
any portion of the pump pulse which passes through said SBS amplifier and out of the second end thereof is reflected from the second polarized beam splitter out of the laser pulse compression device.

* * * * *